United States Patent Office 2,958,691
Patented Nov. 1, 1960

2,958,691

CERTAIN ESTERS OF N-SUBSTITUTED ETHYLENE IMINE CARBOXYLIC ACIDS AND METHOD

Jiří Smrt, 15 Karlovo nam., Prague 2, Czechoslovakia; Jiří Beránek, 154 Cechova, Ruzyn, Czechoslovakia; and Jiří Sicher, 25 Kladska, Prague 12, Czechoslovakia No Drawing. Filed July 31, 1957, Ser. No. 675,261

Claims priority, application Czechoslovakia Aug. 3, 1956

5 Claims. (Cl. 260—239)

D-4-amino-3-isoxazolidinone, an antibiotic, was originally prepared from biological material. The first synthesis which used serine methyl ester hydrochloride was published in J. Am. Chem. Soc. 77, 2345 (1955). The synthesis requires six steps, some of which are rather difficult.

The present invention has for its object a new method of preparing D-4-amino-3-isoxazolidinone. It has the advantage of comparatively high yields with the further advantage that individual preparation steps are rather simple and easily controlled.

The new method consists of the following steps: A salt of a serine ester, such as serine methyl ester hydrochloride, is condensed with a triarylmethyl halogenide in the presence of a tertiary base to form a N-triarylmethyl serine ester, which is then reacted with a sulfohalogenide R″SO₂X in the presence of a tertiary base to form a O—R″-sulfonyl-N-triarylmethyl serine ester; the latter is then cyclized by means of a basic agent to the ester of N-triarylmethyl ethylene imine carboxylic acid of the general formula

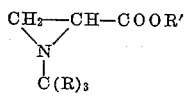

wherein R is an aryl group, R' is a lower alkyl and R″ an alkyl, aryl or aralkyl group, X being either chlorine or bromine.

The obtained ester is converted to the corresponding ethylene imine hydroxamic acid by means of hydroxylamine, and said hydroxamic acid is reacted with an acidic agent HX to form β-X-α-NHC(R)₃—propionhydroxamic acid under ring opening. The latter is then cyclized by means of a basic condensation agent which in aqueous solution has a pH of 7–14, to the final product.

The process may be illustrated by the following equations:

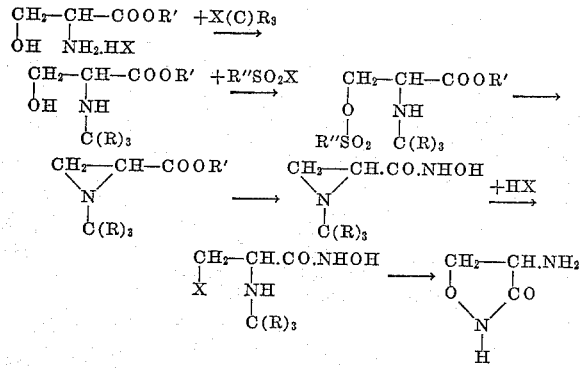

The symbols R, R', R″ and X in these formulae have the same definitions as indicated previously. Although R may signify any aryl group it is nevertheless most advantageous to use the simplest and most readily accessible triphenylmethylderivate, i.e. triphenylmethylchloride (or bromide), particularly since this group does not appear in the final product.

The synthesis in the first three steps may be carried out either with or without isolation of the intermediates. In the first case a suspension of a serine ester salt in an anhydrous organic solvent, such as chloroform, methylene chloride, benzene or the like is reacted with a tertiary amine, such as triethyl amine, N-ethyl piperidine or N-ethyl morpholine, and with a triaryl methyl halogenide at temperatures under 10° C. The N-triaryl methyl serine ester thus obtained is reacted with an organic sulfohalogenide of the type R″SO₂X (wherein R″ is an alkyl, aryl or aralkyl radical and X is Cl or Br) in the presence of pyridine or some other tertiary base at temperatures under 40° C. The most suitable sulfonyl chlorides are methane or ethane sulfonyl chloride, benzene sulfonyl and p-toluene sulfonyl chlorides. The last step of the synthesis, i.e. the cyclization of the O-alkyl or O-aryl or O-aralkyl sulfonyl-N-triaryl methyl serine ester to N-triaryl methyl ethylene imine carboxylic acid ester is carried out by means of basic agents such as tertiary bases, alkali metal alcoholates, alkali metal salts of organic acids or the like, at temperatures between 10 and 150° C.

The synthesis carried out more economically without the isolation of intermediates. In this case a suspension of a serine ester salt in an anhydrous organic solvent is reacted with at least four mols of a tertiary base of the same kind as indicated above at temperatures below 10° C. At the same temperature one mol of a triaryl methyl halogenide is stirred into the reaction mixture, whereby the triaryl methylation on the nitrogen atom is achieved. Thereupon one mol of a sulfonyl halogenide of the type R″SO₂X, the symbols having the same meaning as above, is added at temperatures below 40° C. The reaction mixture is then heated to boiling either under reflux or to a higher temperature in a closed vessel.

The preparation of the hydroxamic acid in the fourth step is advantageously carried out by reacting hydroxylamine with an ester of a N-substituted ethylene imine carboxylic acid in an alcoholic solution or in an organic solvent medium, such as in dioxane, tetrahydrofurane or the like. The yield may be increased by the addition of basic agents, such as alkali metal oxides, hydroxides or alcoholates, or corresponding alkaline earth metal compounds. The yields may be further increased by using a greater than stoichiometric amount of hydroxylamine. The reaction in this step is advantageously carried out at temperatures below the boiling point of the solvent used.

As acid agent HX in the fifth step there may be used hydrogen chloride or hydrogen bromide. These agents should to be added in an amount of two or three equivalents. In this step too an organic solvent like benzene, chloroform or ether may be used.

The fifth step of the reaction may be carried out either in an open vessel at temperatures below the boiling point of the solvent, or in a closed vessel at higher temperatures, i.e. under pressure. The isometric compound simultaneously formed, the β-amino-α-X-propio hydroxamic acid, may be removed by recrystallization from water or from methanol or from their mixtures respectively, for which purpose ether or dioxane or a similar solvent may be added. During the ring opening the substituent C(R)₃ is split off and replaced by hydrogen.

Various compounds may be used as basic condensation agents in the last step various compounds may be used, such as hydroxides, alcoholates and oxides of alkali metals, oxides of alkaline earth metals, salts with alkaline reaction, ammonia, amines and organic nitrogen bases. Particularly good results may be obtained when using strongly basic anion exchange resins as basic condensation agents for the cyclization.

The method according to the invention is illustrated by the following examples.

*Example 1*

7.75 g. of serine methyl ester hydrochloride are suspended in 70 cc. of methylene chloride, 15 cc. of triethyl amine and thereafter 14 g. of triphenyl methyl chloride in portions are added at 0–10° C. After one hour at room temperature the mixture is shaken out twice with 30 cc. of water, the organic layer is dried with anhydrous sodium sulfate and evaporated. The yield of N-trityl serine methyl ester, melting at 125–131° C., is 16.3 g.

10.8 g. of this intermediate are dissolved in 50 cc. of pyridine and 2.5 cc. of methane sulfonyl chloride are added. The mixture is left standing at room temperature. The next day the mixture is diluted with 200 cc. of water and extracted twice with 30 cc. of chloroform. The chloroform solution yields by evaporating in vacuo 11.9 g. of O-mesyl-N-trityl serine methyl ester, M.P. 121–123° C.

8.8 g. of this intermediate are dissolved in 20 cc. of benzene, whereafter 1 cc. of methanol and 2.5 cc. of N-ethyl piperidine are added. The mixture is heated 8 hours at boiling under reflux. After cooling down the mixture is extracted three times with 20 cc. of water. By evaporation of the benzene solution a raw product is obtained, yielding by recrystallization from 25 cc. of cyclohexane 5.5 g. of N-trityl ethyleneimine carboxylic acid methyl ester, M.P. 128° C.

61.7 g. of D,L-triphenylmethyl ethylene imine-2-carboxylic acid methyl ester are dissolved in 100 cc. of dioxane. This solution is added to a mixture prepared previously by dissolving 12.4 g. of metallic sodium in 150 cc. of methanol and adding a solution of 25.2 g. of hydroxylamine hydrochloride in 150 cc. of methanol. The mixture thus obtained is left standing three days at room temperature, whereafter 100 cc. of water and 22 cc. of glacial acetic acid are added. The solution is diluted with water to 2000 cc., whereby the raw hydroxamic acid is separated. After a recrystallization from 600 cc. of benzene there are obtained 58 g. of D,L-1-triphenylmethyl ethylene imine-2-carbhydroxamic acid, M.P. 132–136° C.

34 g. of this intermediate are dissolved in 100 cc. of chloroform, to which 200 cc. of benzene were added. Then gaseous hydrogen chloride is introduced until saturation. After two hours an insoluble substance is separated, which is purified by dissolving in 200 cc. of methanol and precipitating with 200 cc. of ether. The yield of D,L-β-chloro-α-amino propiohydroxamic acid hydrochloride, M.P. 184–187° C., is 11.6 g.

7 g. of this substance are dissolved in 200 cc. of water and the solution is led through a column filled with a strongly basic anion exchange resin such as amberlite IRA–400 or staionit OAL. Then the column is washed with 200 cc. of water and 50 cc. of methanol. The desired substance is obtained by elution with 10 cc. of acetic acid in 500 cc. of methanol. The eluate is separated into 100 cc. fractions. By cooling down to −70° C., D,L-4-amino-3-isoxazolidinone, M.P. 138–140° C. is crystallized from a fraction in a yield of 2 g.

*Example 2*

15.5 g. of serine methyl ester hydrochloride are suspended by stirring in 150 cc. of anhydrous chloroform. The mixture is then cooled down to 0° C. and 60 cc. of N-ethyl piperidine are added while stirring and cooling at such rate as to maintain the temperature at below 5° C. After 30 minutes stirring at the same temperature a solution of 8.1 cc. of methyl sulfochloride in 20 cc. of chloroform are added so slowly, that the temperature does not exceed 10° C. The reaction mixture is mixed with 15 cc. of methanol and heated 15 hours at boiling under reflux. The chloroform solution is shaken out three times with 100 cc. of water, dried with anhydrous sodium sulfate and evaporated. The residue is dissolved in 100 cc. of cyclohexane. By crystallization from this solution there are obtained 27.3 g. of triphenyl methyl ethylene imine carboxylic acid methyl ester, M.P. 128–131° C. 7.3 g. of D-1-triphenylmethyl ethylene imine-2-carboxylic acid methyl ester are dissolved in 10 cc. of dioxane and the solution thus obtained is added to a mixture of 3 g. of hydroxylamine hydrochloride in 25 cc. of methanol and 1.5 g. of sodium in 25 cc. of methanol at room temperature. After 3 days standing at room temperature the mixture is acidified with 2.6 cc. of acetic acid and diluted slowly while stirring with 200 cc. of water. The separated substance is washed with 200 cc. of water and dried at 40° C. There are obtained 7.3 g. of D-1-triphenylmethyl ethyleneimine-2-carbhydroxamic acid, M.P. 122–123° C.

7.3 g. of this intermediate are stirred into 50 cc. of benzene and the mixture is saturated at room temperature with gaseous hydrogen chloride. After one hour standing the separated substance is sucked off and recrystallized from a mixture of 60 cc. of methanol and 120 cc. of ether. There are obtained 2.95 g. of D-α-amino-β-chloropropio hydroxamic acid hydrochloride, M.P. 197–198° C.

2 g. of this intermediate are dissolved in 20 g. of water and the solution is led through a 40 cc. column filled with anion exchange resin Amberlite IRA–400 in an OH-cycle. After washing with 100 cc. of water the column is slowly eluated with 20 percent acetic acid. The eluate which gives a red color with ferric chloride is diluted with 80 cc. of ethanol. By cooling the ethanolic solution to −70° C. there are obtained 0.6 g. of D-4-amino-3-isoxazolidinone, M.P. 150–152° C. The substance is identical with the natural antibiotic. Its value of $\alpha_D^{20}$ is 114.5.

What I claim is:

1. As a new composition of matter, an ester of a N-substituted ethylene imine carboxylic acid having the following structural formula:

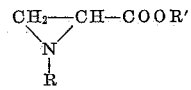

wherein R is the triphenylmethyl group and R' is a lower alkyl group.

2. As a new composition of matter, an ester of a N-substituted ethylene imine carboxylic acid having the following structural formula:

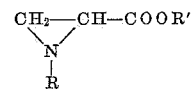

wherein R is the triphenylmethyl group and R' is the methyl group.

3. A method of producing an ester of a N-substituted ethylene imine carboxylic acid having the following structural formula:

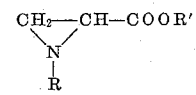

wherein R is the triphenylmethyl group and R' is a lower alkyl group, comprising the steps of reacting serine methyl ester hydrochloride suspended in an anhydrous organic liquid selected from the group consisting of chloroform, methylene chloride and benzene with triphenylmethyl halogenide in the presence of a tertiary amine selected from the group consisting of triethylamine, N-ethyl piperidine, N-ethyl morpholine and pyridine so as to form the corresponding N-triphenylmethyl serine ester; reacting the thus formed N-triphenylmethyl serine ester with an organic sulfohalogenide selected from the group consisting of methane sulfonyl halide, ethane sulfonyl halide, benzene sulfonyl halide and p-toluene sulfonyl halide in the presence of a tertiary amine selected from the group consisting of triethylamine, N-ethyl piperidine, N-ethyl morpholine and pyridine so as to form the corresponding sulfonyl-N-triphenylmethyl serine ester; and cyclizing said sulfonyl-N-triphenylmethyl serine ester by means of a basic condensation agent selected from the group consisting of hydroxides, alcoholates, oxides and alkaline salts of alkali metals, alkaline earth oxides, ammonia, basic amines and strongly basic anion exchange resins so as to form the corresponding N-triphenylmethyl ethylene imine carboxylic acid ester.

4. A method of producing an ester of a N-substituted ethylene imine carboxylic acid having the following structural formula:

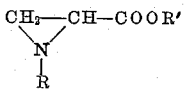

wherein R is the triphenylmethyl group and R' is a lower alkyl group, comprising the steps of reacting serine methyl ester hydrochloride suspended in an anhydrous organic liquid selected from the group consisting of chloroform, methylene chloride and benzene with triphenylmethyl halogenide in the presence of a tertiary amine selected from the group consisting of triethylamine, N-ethyl piperidine, N-ethyl morpholine and pyridine at a temperature below 10° C. so as to form the corresponding N-triphenylmethyl serine ester; reacting the thus formed N-triphenylmethyl serine ester with an organic sulfohalogenide selected from the group consisting of methane sulfonyl halide, ethane sulfonyl halide, benzene sulfonyl halide and p-toluene sulfonyl halide in the presence of a tertiary amine selected from the group consisting of triethylamine, N-ethyl piperidine, N-ethyl morpholine and pyridine at a temperature below 40° C. so as to form the corresponding sulfonyl-N-triphenylmethyl serine ester; and cyclizing said sulfonyl-N-triphenylmethyl serine ester by means of a basic condensation agent selected from the group consisting of hydroxides, alcoholates, oxides and alkaline salts of alkali metals, alkaline earth oxides, ammonia, basic amines and strongly basic anion exchange resins so as to form the corresponding N-triphenylmethyl ethylene imine carboxylic acid ester.

5. A method of producing an ester of a N-substituted ethylene imine carboxylic acid having the following structural formula:

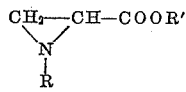

wherein R is the triphenylmethyl group and R' is a lower alkyl group, comprising the steps of reacting serine methyl ester hydrochloride suspended in an anhydrous organic liquid selected from the group consisting of chloroform, methylene chloride and benzene with triphenylmethyl halogenide in the presence of a tertiary amine selected from the group consisting of triethylamine, N-ethyl piperidine, N-ethyl morpholine and pyridine at a temperature below 10° C. so as to form the corresponding N-triphenylmethyl serine ester; reacting the thus formed N-triphenylmethyl serine ester with an organic sulfohalogenide selected from the group consisting of methane sulfonyl halide, ethane sulfonyl halide, benzene sulfonyl halide and p-toluene sulfonyl halide in the presence of a tertiary amine selected from the group consisting of triethylamine, N-ethyl piperidine, N-ethyl morpholine and pyridine at a temperature below 40° C. so as to form the corresponding sulfonyl-N-triphenylmethyl serine ester; and cyclizing said sulfonyl-N-triphenylmethyl serine ester by means of a basic condensation agent selected from the group consisting of hydroxides, alcoholates, oxides and alkaline salts of alkali metals, alkaline earth oxides, ammonia, basic amines and strongly basic anion exchange resins at a temperature between 10–150° C. so as to form the corresponding N-triphenylmethyl ethylene imine carboxylic acid ester.

References Cited in the file of this patent

UNITED STATES PATENTS 2,772,281     Holly et al. _____ Nov. 27, 1956
2,789,983     Harned _____ Apr. 23, 1957

OTHER REFERENCES

Hudlicky: Chem. Abstracts, vol. 51, pp. 14683–14685 (1957) (Abstracting Smrt Chem. Listy (vol. 51, pp. 112–122) 1957)).
Smrt: Experientia, vol. 13, p. 291 (1957).
Fieser et al.: Organic Chemistry, p. 30 (1956).
Helferich et al.: Berichte, vol. 58, pp. 872–886 (1925).
Stammer et al.: J. Am. Chem. Soc., vol. 77, pp. 2346–2347 (1955).